US010259437B2

(12) United States Patent
Nishiwaki et al.

(10) Patent No.: US 10,259,437 B2
(45) Date of Patent: Apr. 16, 2019

(54) VEHICLE BRAKING DEVICE

(71) Applicant: ADVICS CO., LTD., Kariya-shi, Aichi-ken (JP)

(72) Inventors: Kunihiro Nishiwaki, Toyota (JP); Takayuki Yamamoto, Nagakute (JP); Kyosuke Hata, Kariya (JP); Yasuhito Ishida, Toyokawa (JP)

(73) Assignee: ADVICS CO., LTD., Kariya-shi, Aichi-Ken (JP)

( * ) Notice: Subject to any disclaimer, the term of this patent is extended or adjusted under 35 U.S.C. 154(b) by 0 days.

(21) Appl. No.: 15/510,842

(22) PCT Filed: Nov. 25, 2015

(86) PCT No.: PCT/JP2015/083043
§ 371 (c)(1),
(2) Date: Mar. 13, 2017

(87) PCT Pub. No.: WO2016/084837
PCT Pub. Date: Jun. 2, 2016

(65) Prior Publication Data
US 2017/0274880 A1 Sep. 28, 2017

(30) Foreign Application Priority Data
Nov. 25, 2014 (JP) .................. 2014-238110

(51) Int. Cl.
*B60T 8/40* (2006.01)
*B60T 17/22* (2006.01)
(Continued)

(52) U.S. Cl.
CPC ............ *B60T 8/4086* (2013.01); *B60T 7/042* (2013.01); *B60T 13/14* (2013.01); *B60T 13/146* (2013.01);
(Continued)

(58) Field of Classification Search
CPC .... B60T 8/4086; B60T 2270/60; B60T 13/14; B60T 2220/04; B60T 8/4077
(Continued)

(56) References Cited

U.S. PATENT DOCUMENTS 8,801,112 B2 * 8/2014 Ishida .................... B60T 7/042
303/114.2
2008/0210499 A1 9/2008 Isono et al.
(Continued)

FOREIGN PATENT DOCUMENTS

CN 101341056 A 1/2009
CN 102371981 A 3/2012
(Continued)

OTHER PUBLICATIONS

International Search Report (PCT/ISA/210) dated Feb. 9, 2016, by the Japanese Patent Office as the International Searching Authority for International Application No. PCT/JP2015/083043.
(Continued)

*Primary Examiner* — Xuan Lan Nguyen
(74) *Attorney, Agent, or Firm* — Buchanan Ingersoll & Rooney PC

(57) ABSTRACT

A vehicle braking device includes: a stroke simulator for generating a hydraulic pressure corresponding to a brake operation in a hydraulic chamber, the stroke simulator having a cylinder part and a piston part for sliding through the inside of the cylinder part in conjunction with a brake operation of a brake pedal; a booster mechanism having an input part directly pressed by the piston part or pressed by a spring interposed between the input part and the piston part in conjunction with the sliding of the piston part, and thereby moved in sliding fashion through the inside of the cylinder, and a hydraulic pressure generating part for generating a first hydraulic pressure corresponding to the movement of the
(Continued)

input part based on the hydraulic pressure of an accumulator; and a wheel cylinder for applying a braking force to a vehicle wheel on the basis of the first hydraulic pressure.

8 Claims, 2 Drawing Sheets

(51) Int. Cl.
 *B60T 7/04* (2006.01)
 *B60T 13/14* (2006.01)
 *B60T 13/66* (2006.01)
 *B60T 13/68* (2006.01)
(52) U.S. Cl.
 CPC .......... *B60T 13/662* (2013.01); *B60T 13/686* (2013.01); *B60T 17/22* (2013.01); *B60T 2220/04* (2013.01); *B60T 2270/60* (2013.01); *B60T 2270/604* (2013.01)
(58) Field of Classification Search
 USPC ....................................................... 303/114.1
 See application file for complete search history.

(56) References Cited

U.S. PATENT DOCUMENTS

| | | | |
|---|---|---|---|
| 2008/0257670 A1* | 10/2008 | Drumm | B60T 8/4077 188/358 |
| 2012/0013174 A1 | 1/2012 | Ishida | |
| 2013/0057054 A1 | 3/2013 | Ishida | |
| 2015/0151730 A1 | 6/2015 | Shimizu et al. | |
| 2015/0266458 A1 | 9/2015 | Okano et al. | |

FOREIGN PATENT DOCUMENTS

| | | |
|---|---|---|
| JP | 2009-507714 A | 2/2009 |
| JP | 2011-240872 A | 12/2011 |
| JP | 2014-19172 A | 2/2014 |
| JP | 2014-83935 A | 5/2014 |

OTHER PUBLICATIONS

Written Opinion (PCT/ISA/237) dated Feb. 9, 2016, by the Japanese Patent Office as the International Searching Authority for International Application No. PCT/JP2015/083043.

* cited by examiner

[Fig.1]
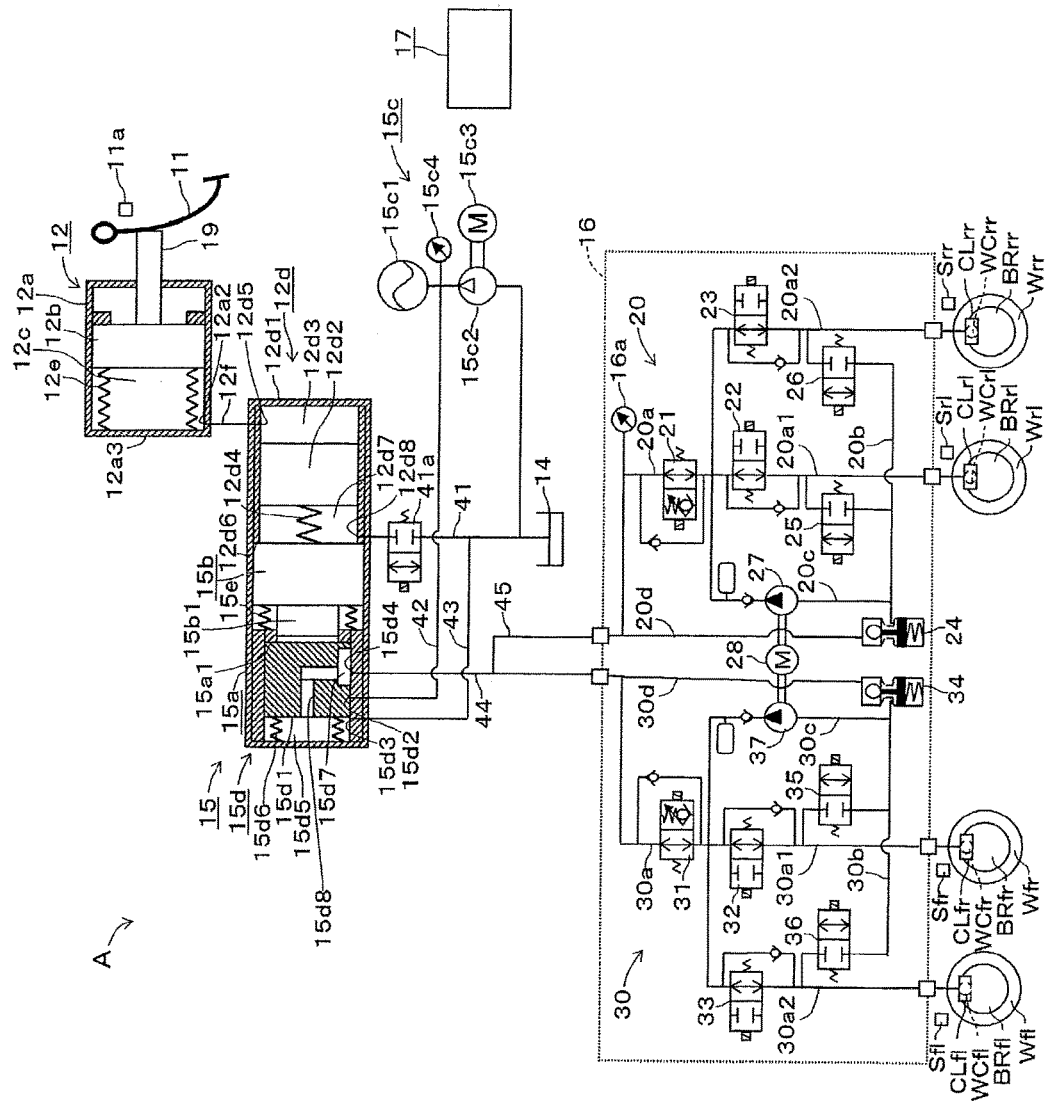
[Fig.2]
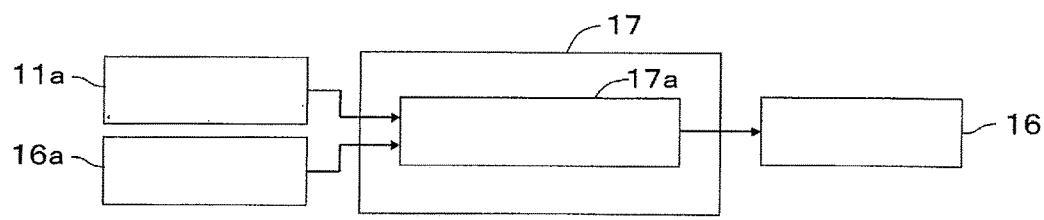
11a: PEDAL STROKE SENSOR
16: ACTUATOR
16a: HYDROULIC PRESSURE SENSOR
17: ECU
17a: HYDROULIC PRESSURE CONTROL PART

[Fig.3]
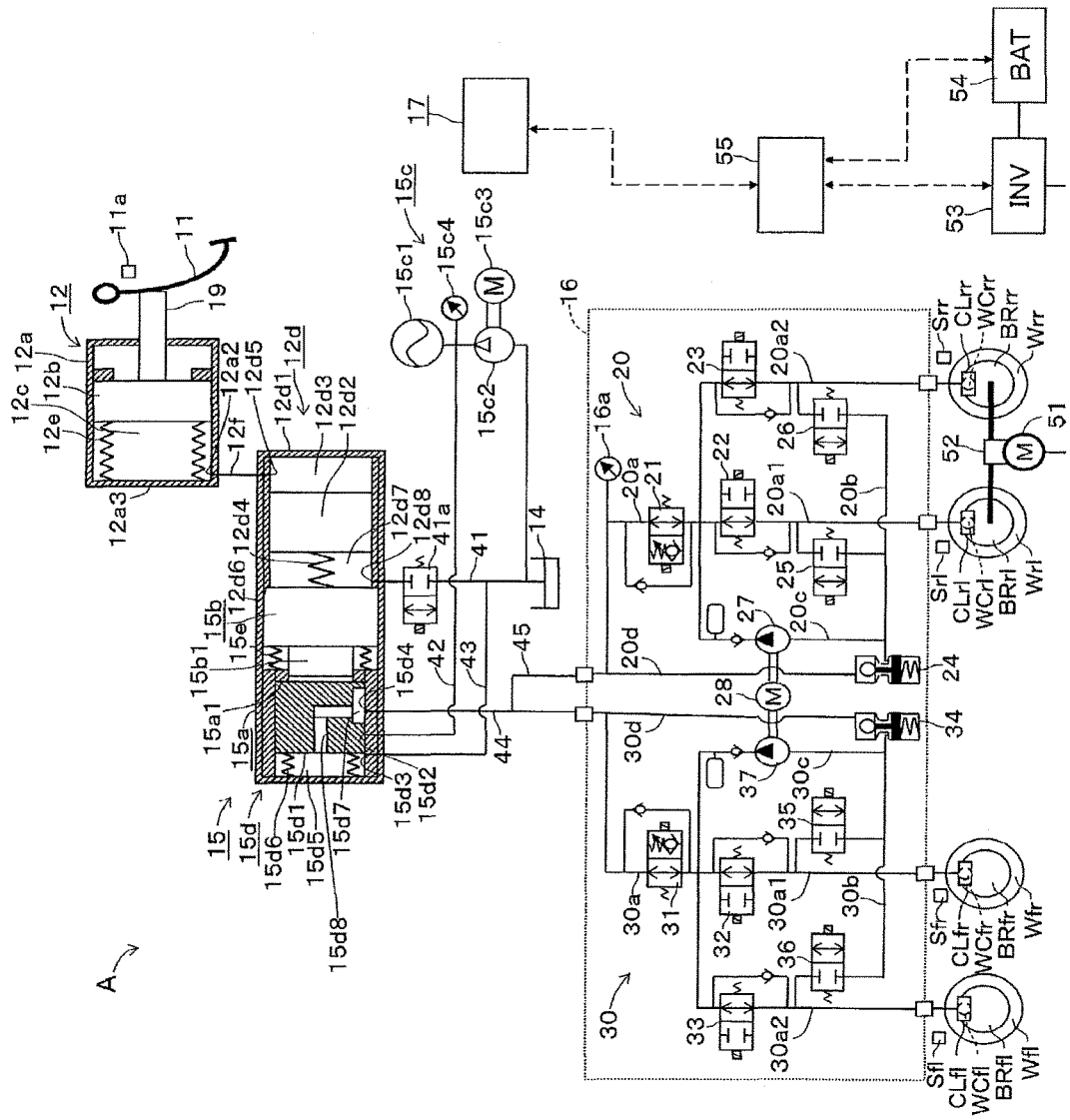
[Fig.4]
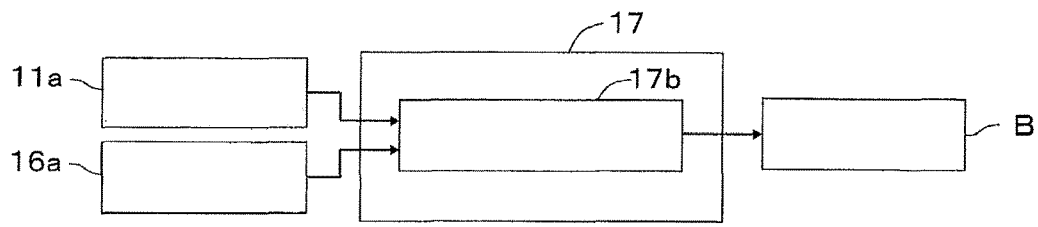
11a: PEDAL STROKE SENSOR
B: REGENERATIVE BRAKING DEVICE
16a: HYDROULIC PRESSURE SENSOR
17: ECU
17b: REGENERATIVE BRAKING FORCE APPLYING PART

VEHICLE BRAKING DEVICE

TECHNICAL FIELD

The present invention relates to a vehicle braking device.

BACKGROUND ART

As one style of vehicle braking devices, a style described in Patent Literature 1 is known. The vehicle braking device shown in FIG. 1 of Patent Literature 1 includes a pedal stroke simulator, a pressure control valve 34, and the like. The pedal stroke simulator is coupled to a pressure chamber 14 of a master cylinder 3 through a connecting line 24. The pressure control valve 34 is a control valve which controls a pressure guided to a space part 21 of the master cylinder 3 by being hydraulically coupled to a pressure supply device 33 and a first pressure fluid supply tank 42 and can be driven by an application force through application force transmission means 52 and 35.

CITATIONS LIST

Patent Literature

Patent Literature 1: JP 2009-507714 T

SUMMARY OF THE INVENTION

Technical Problem

The vehicle braking device described in Patent Literature 1 disadvantageously has a complex structure because a pedal stroke simulator and a pressure control valve 34 must be coupled with different oil passages, respectively.

Thus, the present invention has been made to solve the problem described above and its object is to provide a vehicle braking device having a simple structure.

Solution to Problem

In order to solve the above problem, as the constitutional characteristics of the invention, a vehicle braking device includes an operation corresponding pressure generating mechanism which has a cylinder part and a piston part sliding in the cylinder part in conjunction with a brake operation for operating a brake operation member and generates a hydraulic pressure corresponding to the brake operation in the cylinder part and a first hydraulic chamber partitioned by the piston part, a first hydraulic pressure generating mechanism having an input part slid and moved in the cylinder by being directly pressed by the piston part or an interpolated member interposed between the input part and the piston part in conjunction with sliding of the piston part and a hydraulic pressure generating part generating a first hydraulic pressure corresponding to movement of the input part based on a hydraulic pressure of an accumulating part accumulating a hydraulic fluid, and a braking force applying mechanism applying a braking force to a vehicle wheel of a vehicle based on the first hydraulic pressure.

Advantageous Effect of the Invention

According to this, when the brake operation member is operated, the input part is moved by a mechanical work in conjunction with sliding of the piston part, and the hydraulic pressure generating part generates the first hydraulic pressure depending on movement of the input part. Thus, since an additional oil passage need not be disposed between the operation corresponding pressure generating mechanism and the first hydraulic pressure generating mechanism, a vehicle braking device having a simple structure can be provided.

BRIEF DESCRIPTION OF DRAWINGS

FIG. 1 is a schematic view showing a first embodiment of a vehicle braking device according to the present invention.

FIG. 2 is a flow chart executed by a brake ECU shown in FIG. 1.

FIG. 3 is a schematic view showing a second embodiment of a vehicle braking device according to the present invention.

FIG. 4 is a flow chart executed by a brake ECU shown in FIG. 3.

DESCRIPTION OF EMBODIMENTS

First Embodiment

A first embodiment in which a vehicle braking device according to the present invention is applied to a vehicle will be described below with reference to the accompanying drawings. The vehicle in this embodiment is a vehicle which is not a hybrid vehicle but a vehicle including only an engine as a power source. The vehicle includes a hydraulic pressure braking part A directly applying a hydraulic pressure braking force to wheels Wfl, Wfr, Wrl, and Wrr to brake the vehicle. The hydraulic pressure braking part A includes, as shown in FIG. 1, a brake pedal 11 serving as a brake operation member, a stroke simulator part 12, a reservoir tank 14, a booster mechanism (first hydraulic pressure generating mechanism) 15, an actuator (braking hydraulic pressure adjusting device) 16, a brake ECU 17, and a wheel cylinder.

Wheel cylinders WC regulate rotations of the wheels W, respectively, and are disposed in calipers CL, respectively. Each of the wheel cylinders WC is a braking force applying mechanism applying a braking force to each of the vehicle wheels W of the vehicle based on a first hydraulic pressure (will be described later). The braking force applying mechanism is configured to make it possible to apply a braking force to each of the vehicle wheels W based on a first hydraulic pressure and a second hydraulic pressure. When a pressure (brake hydraulic pressure: first hydraulic pressure and second hydraulic pressure) of a brake fluid from the actuator 16 or the booster mechanism 15 is supplied to the wheel cylinders WC, each piston (not shown) of the wheel cylinders WC presses one pair of brake pads (not shown) serving as a friction member to pinch a disk rotor DR serving as a rotating member rotating together with the vehicle wheel W from both sides thereof so as to regulate the rotation. In the embodiment, although a disk brake system is employed, a drum brake system may be employed. The vehicle wheel W is one of the front-left, front-right, rear-left and rear-right wheels Wfl, Wfr, Wrl, and WIT.

Near the brake pedal 11, a pedal stroke sensor 11a detecting a brake pedal stroke (manipulated variable) which is a brake operation state obtained by stepping-on of the brake pedal 11 is disposed. The pedal stroke sensor 11a is coupled to the brake ECU 17 to output a detection signal to the brake ECU 17.

The brake pedal 11 is coupled to the stroke simulator part 12 through a push rod 19. The stroke simulator part 12 includes a cylinder part 12a, a piston 12b which can liquid-tightly slide in the cylinder part 12a, a hydraulic chamber 12c formed by the cylinder part 12a and the piston 12b, a stroke simulator 12d communicating with the hydraulic chamber 12c.

On one end (right side in the drawing) in a sliding direction (axial direction) of the piston 12b, the push rod 19 is connected. The piston 12b is disposed in the hydraulic chamber 12c. In the hydraulic chamber 12c, a spring 12e interposed between the piston 12b and a bottom wall 12a3 of the cylinder part 12a to bias the piston 12c in a direction in which the piston 12c extends.

The hydraulic chamber 12c communicates with the stroke simulator 12d through an oil passage 12f coupled to an input/output port 12a2. The hydraulic chamber 12c communicates with the reservoir tank 14 through a coupling oil passage (not shown).

The stroke simulator 12d causes the brake pedal 11 to generate a stroke (reaction force) having a magnitude depending on an operation state of the brake pedal 11. More specifically, the stroke simulator 12d is an operation corresponding pressure generating mechanism generating a hydraulic pressure corresponding to a brake operation in a hydraulic chamber 12d3. The stroke simulator 12d includes a cylinder part 12d1, a piston part 12d2, the hydraulic chamber 12d3, and a spring 12d4. The piston part 12d2 liquid-tightly slides in the cylinder part 12d1 in conjunction with a brake operation for operating the brake pedal 11. The hydraulic chamber (first hydraulic chamber) 12d3 is formed by being partitioned between the cylinder part 12d1 and the piston part 12d2. The hydraulic chamber 12d3 communicates with the hydraulic chamber 12c through the oil passage 12f coupled to an input/output port 12d5. The spring 12d4 biases the piston part 12d2 in a direction for reducing the volume of the hydraulic chamber 12d3. The spring 12d4 is an interpolated member interposed between the piston part 12d2 and an input part 15b. As the interpolated member, in place of the spring, another elastic member, for example, a rubber member may be employed.

When the piston part 12d2 is pressed to the left, the input part 15b does not move in a first period at the beginning of a brake operation regardless of sliding of the piston part 12d2. Until a force pressing the piston part 12d2 to the left is larger than a total sum of a biasing force of the spring 12d4, a biasing force of the spring 15e, and a sliding resistance of the input part 15b, the input part 15b does not begin to move to the left. Before that, when a force pressing the piston part 12d2 to the left is smaller than the sum of the forces, the input part 15b does not move.

Furthermore, when the brake operation increases after the first period is finished, the input part 15b moves in conjunction with sliding of the piston part 12d2.

The booster mechanism 15 is a mechanism (first hydraulic pressure generating mechanism) to generate a first hydraulic pressure depending on movement of the input part 15b based on a hydraulic pressure of an accumulator (accumulation part) 15c1 accumulating a hydraulic fluid (brake fluid) and to output the first hydraulic pressure to a first piping system 20 and a second piping system 30 (actuator 16). The booster mechanism 15 includes a cylinder 15a, an input part 15b, a pressure supply device 15c, and a hydraulic pressure generating part 15d.

The cylinder 15a is coaxially and integrally coupled to the cylinder part 12d1 of the stroke simulator 12d.

The input part 15b is to input a brake operation (hydraulic pressure depending on the brake operation) to the booster mechanism 15. The input part 15b is slidably moved in the cylinder 15a by being directly pressed by the piston part 12d2 or being pressed by the spring 12d4 serving as an interpolated member interposed between the input part 15b and the piston part 12d2 in conjunction with sliding of the piston part 12d2 of the stroke simulator 12d. The input part 15b is formed in the form of a piston and liquid-tightly slides in the cylinder 15a. A one-end peripheral edge of the input part 15b is designed to be in contact with a step part 12d6. At the other end of the input part 15b, a step part 15b1 is projected. The distal end of the step part 15b1 is designed to be in contact with one end of a spool part 15d1. The input part 15b has one end being in contact with the other end of the input part 15b and has the other end being biased toward one-end side by the spring 15e being in contact with a projection part 15a1 of the cylinder 15a.

A hydraulic chamber 12d7 is partitioned and formed between the input part 15b and the piston part 12d2. The hydraulic chamber 12d7 communicates with the reservoir tank 14 through an oil passage 41 coupled to an input/output port 12d8. On the oil passage 41, an electromagnetic valve 41a opened/closed according to an opening/closing instruction from the brake ECU 17 is provided. The electromagnetic valve 41a is configured by a two-position electromagnetic valve the communication/noncommunication state of which can be controlled. The electromagnetic valve 41a is of a no mal close type which is set in the noncommunication state when a control current to a solenoid coil included in the electromagnetic valve 41a is zero (non-energization state) and set in the communication state when a control current flows in the solenoid coil (energization state).

A pressure supply device 15c includes the reservoir tank 14 serving a low-pressure source, the accumulator (accumulating part) 15c1 serving as a high-pressure source and accumulating a hydraulic fluid, a pump 15c2 which sucks a brake fluid in the reservoir tank 14 and sends the brake fluid to the accumulator 15c1 by pressure, and an electric motor 15c3 drives the pump 15c2. The reservoir tank 14 opens to the atmosphere, and a hydraulic pressure of the reservoir tank 14 is equal to atmospheric pressure. The low-pressure source has a pressure lower than that of the high-pressure source. Although the reservoir tank 14 is used in common as the low-pressure source of the pressure supply device 15c, another reservoir tank may be disposed. The pressure supply device 15c includes a pressure sensor 15c4 which detects a pressure of the brake fluid supplied from the accumulator 15c1 to output the detected pressure to the brake ECU 17.

The hydraulic pressure generating part 15d generates a first hydraulic pressure depending on movement of the input part 15b based on a hydraulic pressure of the accumulator (accumulating part) 15c1 accumulating a hydraulic fluid. The hydraulic pressure generating part 15d includes the spool part 15d1 liquid-tightly sliding in the cylinder 15a. In the hydraulic pressure generating part 15d, a high-pressure port 15d2, a low-pressure port 15d3, and an output port 15d4 are formed. The high-pressure port 15d2 is directly coupled to the accumulator 15c1 through an oil passage 42. The low-pressure port 15d3 is directly coupled to the reservoir tank 14 through an oil passage 43 coupled to the oil passage 41. The output port 15d4 is coupled to an actuator 16 (consequently a wheel cylinder WC) through an oil passage 44.

The oil passage 44 is coupled to oil passages 30a and 30d of the second piping system 30. An oil passage 45 branched from the middle of the oil passage 44 is coupled to oil passages 20a and 20d of the first piping system 20.

A hydraulic chamber 15d5 is partitioned and formed between the cylinder 15a (bottom wall) and the spool part 15d1. In the hydraulic chamber 15d5, a spring 15d6 interposed between the cylinder 15a (bottom wall) and the spool part 15d1 to bias the hydraulic chamber 15d5 in a direction in which the hydraulic chamber 15d5 extends is disposed. The spool part 15d1 is biased by the spring 15d6 and located at a predetermined position (see FIG. 1). The predetermined position of the spool part 15d1 is a position at which one end side of the spool part 15d1 is brought into contact with the projection part 15a1 and positioned and fixed, and a position of the spool part 15d1 immediately before the other-end-side end of the spool part 15d1 seals the low-pressure port 15d3.

In the spool part 15d1, an oil passage 15d8 communicating with a hydraulic chamber 15d7 is formed. As shown in FIG. 1, when the spool part 15d1 is at the predetermined position, the low-pressure port 15d3 and the output port 15d4 communicate with each other through the oil passage 15d8, and the high-pressure port 15d2 is sealed by the spool part 15d1.

The input part 15b is moved to the left and brought into contact with the spool part 15d1, and the spool part 15d1 moves to the left. At this time, the high-pressure port 15d2 and the output port 15d4 communicate with each other through the hydraulic chamber 15d7. At this time, the low-pressure port 15d3 is sealed by the spool part 15d1. Thus, the other end of the spool part 15d1 receives a force corresponding to a servo pressure (increased-pressure state).

When a press force of the spool part 15d1 obtained by the input part 15b and a force corresponding to the servo pressure are balanced with each other, the high-pressure port 15d2 and the low-pressure port 15d3 are sealed by the spool part 15d1 (holding state).

When the input part 15b moves to the right, the spool part 15d1 also moves to the right (reduced-pressure state). At this time, the low-pressure port 15d3 and the output port 15d4 communicate with each other through the oil passage 15d8, and the high-pressure port 15d2 is sealed by the spool part 15d1.

A detailed structure of the actuator 16 will be described below with reference to FIG. 1. The actuator 16 is a pressurizing mechanism which generates a hydraulic pressure corresponding to a brake operation in a first period and adds a difference between a target wheel cylinder pressure and a hydraulic pressure generated by the booster mechanism 15 to the hydraulic pressure generated by the booster mechanism 15 in a period except for the first period. The actuator 16 is also a second hydraulic pressure generating mechanism generating a desired second hydraulic pressure. The second hydraulic pressure generating mechanism generates a second hydraulic pressure depending on, for example, a brake operation. In the actuator 16, the first and second piping systems 20 and 30 are configured. The first piping system 20 controls brake hydraulic pressures applied to the rear-left wheel Wrl and the rear-right wheel Wrr, and the second piping system 30 controls brake hydraulic pressures applied to the front-right wheel Wfr and the front-left wheel Wfl. More specifically, the front and rear pipings are configured.

Hydraulic pressures supplied from the booster mechanism 15 is transmitted to the wheel cylinders WCrl, WCrr, WCfr, and WCfl through the first piping system 20 and the second piping system 30. The first piping system 20 includes an oil passage 20a coupling the oil passage 45 and the wheel cylinders WCrl and WCrr to each other. The second piping system 30 includes an oil passage 30a coupling the oil passage 44 and the wheel cylinders WCfr and WCfl to each other. Through the oil passages 20a and 30a, the hydraulic pressures supplied from the booster mechanism 15 are transmitted to the wheel cylinders WCrl, WCrr, WCfr, and WCfl.

The oil passages 20a and 30a include differential pressure control valves 21 and 31 which can be controlled to a communication state and a differential pressure state. The differential pressure control valves 21 and 31 have valve positions which are adjusted such that the communication state is set in a braking state in which a driver operates the brake pedal 11. When currents are caused to flow in solenoid coils included in the differential pressure control valves 21 and 31, the valve positions of the differential pressure control valves 21 and 31 are adjusted such that the larger the current values are, the larger the differential pressures of the differential pressure states are.

When the differential pressure control valves 21 and 31 are set in the differential pressure states, only when the brake hydraulic pressures on the wheel cylinders WCrl, WCrr, WCfr, and WCfl are higher than the hydraulic pressure supplied from the booster mechanism 15 by predetermined pressures, the brake fluids are allowed to flow from the wheel cylinders WCrl, WCrr, WCfr, and WCfl to the booster mechanism 15. For this reason, the pressures on the wheel cylinders WCrl, WCrr, WCfr, and WCfl are always held at a pressure higher than the pressure on the booster mechanism 15 by a predetermined pressure.

The oil passages 20a and 30a branch into two oil passages 20a1, 20a2, 30a1, and 30a2, respectively, on the wheel cylinder WCrl, WCrr, WCfr, and WCfl sides which are on the downstream sides of the differential pressure control valves 21 and 31. The oil passages 20a1 and 30a1 include first pressure increasing control valves 22 and 32 controlling increases of brake hydraulic pressures to the wheel cylinders WCrl and WCfr, respectively. The oil passages 20a2 and 30a2 include second pressure increasing control valves 23 and 33 controlling increases of brake hydraulic pressures to the wheel cylinders WCrr and WCfl, respectively.

The first and second pressure increasing control valves 22, 23, 32, and 33 are configured by two-position electromagnetic valves the communication/noncommunication states of which can be controlled, respectively. The first and second pressure increasing control valves 22, 23, 32, and 33 are of a normally-open type which is controlled to communication states when control currents to the solenoid coils included in the first and second pressure increasing control valves 22, 23, 32, and 33 are zero (non-energization states) and controlled to noncommunication states when control currents flow in the solenoid coils (energization states).

The first and second pressure increasing control valves 22, 23, 32, and 33 on the oil passages 20a and 30a and the wheel cylinders WCrl, WCrr, WCfr, and WCfl are coupled to pressure-regulating reservoirs 24 and 34 through the oil passages 20b and 30b serving as pressure-reducing oil passages. On the oil passages 20b and 30b, first and second pressure reducing control valves 25, 26, 35, and 36 each configured by a two-position electromagnetic valve the communication/noncommunication state of which can be controlled are disposed, respectively. The first and second pressure reducing control valves 25, 26, 35, and 36 are a normal close type which is controlled to a noncommunication state when control currents to solenoid coils included in the first and second pressure reducing control valves 25, 26, 35, and 36 are zero (non-energization state) and controlled to a communication state when the control currents flow into the solenoid coils (energization state).

Oil passages 20c and 30c serving as reflux oil passages are disposed between the pressure-regulating reservoirs 24 and 34 and the oil passages 20a and 30a serving as main oil passages. On the oil passages 20c and 30c, self-priming pumps 27 and 37 driven by a motor 28 sucking/discharging brake fluids from the pressure-regulating reservoirs 24 and 34 toward the booster mechanism 15 or the wheel cylinders WCrl, WCrr, WCfr, and WCfl are disposed. The motor 28 is driven by controlling energization to a motor relay (not shown).

Oil passages 20d and 30d serving as auxiliary oil passages are disposed between the pressure-regulating reservoirs 24 and 34 and the booster mechanism 15. The pumps 27 and 37 suck the brake fluids from the booster mechanism 15 through the oil passages 20d and 30d and discharge the brake fluids to the oil passages 20a and 30a to supply the brake fluids to the wheel cylinders WCrl, WCrr, WCfr, and WCfl.

Detection signals from wheel speed sensors Sfl, Srr, Sfr, and Srl included in vehicle wheels Wfl, WlT, Wfr, and Wrl, respectively are designed to be input to the brake ECU 17. The brake ECU 17 calculates wheel speeds, estimated vehicle body speed, a slip ratio, and the like on the basis of the detection signals from the wheel speed sensors Sfl, Srr, Sfr, and Srl. The brake ECU 17 executes anti-skid control or the like on the basis of the calculation results. The actuator 16 includes a hydraulic pressure sensor 16a detecting a hydraulic pressure supplied from the booster mechanism 15. The hydraulic pressure sensor 16a is preferably disposed on the oil passage 20a of the first piping system 20. A detection signal from the hydraulic pressure sensor 16a is input to the brake ECU 17 to make it possible to cause the brake ECU 17 to monitor the hydraulic pressure supplied from the booster mechanism 15.

Various controls performed by using the actuator 16 are executed by the brake ECU 17. For example, the brake ECU 17 outputs control currents to control the various control valves 21 to 23, 25, 26, 31 to 33, 35, and 36 included in the actuator 16 and the motor 18 for driving pumps, thereby controlling a hydraulic pressure circuit included in the actuator 16 and independently controlling wheel cylinder pressures transmitted to the wheel cylinders WCrl, WCrr, WCfr, and WCfl. For example, the brake ECU 17 can perform anti-skid control which reduces, holds and increases the wheel cylinder pressures when the vehicle wheels slip in a braking state to prevent the wheels from being locked, sideslip preventing control which automatically increases the wheel cylinder pressure of a wheel to be controlled to suppress a sideslip tendency (understeer tendency or oversteer tendency) so as to make it possible to perform turning along an ideal track.

When an ignition switch is in an off state or a power supply fails, the electromagnetic valve 41a is set in a closed state. When the ignition switch is in an on state and the power supply does not fail, the electromagnetic valve 41a is set in an open state.

The brake ECU 17, in a normal braking state, in a first period in which the input part 15b does not move regardless of sliding of the piston part 12d2, causes the actuator 16 to generate a hydraulic pressure corresponding to a brake operation (hydraulic pressure control part). The brake CU 17, in the first period, causes the actuator 16 (second hydraulic pressure generating mechanism) to generate a second hydraulic pressure depending on a brake operation and causes the wheel cylinders WC (braking force applying mechanisms) to apply a braking force to the vehicle wheels W on the basis of the second hydraulic pressure (hydraulic pressure control part). The brake ECU 17, as shown in FIG. 2, has a hydraulic pressure control part 17a. When the hydraulic pressure control part 17a detects the start of operation of the brake pedal 11 on the basis of a detection signal acquired from the pedal stroke sensor 11a, the hydraulic pressure control part 17a causes the actuator 16 to generate a hydraulic pressure corresponding to a brake operation until the hydraulic pressure sensor 16a detects a hydraulic pressure higher than a predetermined pressure (for example, 0 Pa) from the operation start time.

A normal brake state is to form, when a brake operation is executed, a wheel cylinder pressure depending on the operation and to apply the wheel cylinder pressure to the vehicle wheel to obtain a braking force, and is different from to apply a braking force when no brake operation is executed as in ESC control or the like.

When the ignition switch is in an on state and the power supply does not fail, the electromagnetic valve 41a is set in an open state. Thus, since the hydraulic chamber 12d7 communicates with the reservoir tank 14 through the oil passage 41, when the piston part 12d2 moves to the left depending on a brake operation, a brake fluid in the hydraulic chamber 12d7 can flow into the reservoir tank 14 through the oil path 41. Thus, until a force pressing the piston part 12d2 to the left is larger than a sum of a biasing force of the spring 12d4, a biasing force of the spring 15e, and a force obtained by a sliding resistance of the input part 15b, the input part 15b does not begin to move the left. Before that, when the force pressing the piston part 12d2 to the left is smaller than the sum of the forces, the input part 15b does not move.

When the hydraulic pressure control part 17a ends the increase in pressure by the actuator 16 when the hydraulic pressure sensor 16a detects a hydraulic pressure higher than a predetermined pressure (for example, 0 Pa). In this manner, only a hydraulic pressure generated depending on a brake operation by the booster mechanism 15 is supplied to the wheel cylinders WC.

As is apparent from the above description, the vehicle braking device according to the first embodiment includes a stroke simulator 12d (operation corresponding pressure generating mechanism) which has the cylinder part 12d1 and the piston part 12d2 sliding in the cylinder part 12d1 in conjunction with a brake operation for operating the brake pedal 11 (brake operation member) and generates a hydraulic pressure corresponding to the brake operation in the cylinder part 12d1 and the hydraulic chamber 12d3 (first hydraulic chamber) partitioned by the piston part 12d2, the booster mechanism 15 (first hydraulic pressure generating mechanism) having the input part 15b slid and moved in the cylinder 15a by being directly pressed by the piston part 12d2 or the spring 12d4 (interpolated member) interposed between the input part 15b and the piston part 12d2 in conjunction with sliding of the piston part 12d2 and the hydraulic pressure generating part 15d generating a first hydraulic pressure corresponding to movement of the input part 15b based on a hydraulic pressure of the accumulator 15c1 (accumulating part) accumulating a hydraulic fluid, and the wheel cylinder WC (braking force applying mechanism) applying a braking force to a vehicle wheel of a vehicle based on the first hydraulic pressure.

According to this, when the brake pedal 11 is operated, the input part 15b is moved by a mechanical work in conjunction with sliding of the piston part 12d2, and the hydraulic pressure generating part 15d generates the first hydraulic pressure depending on movement of the input part 15b. Thus, since an additional oil passage need not be disposed between the stroke simulator 12d and the booster mechanism 15, a vehicle braking device having a simple structure can be provided.

In the vehicle braking device according to the first embodiment, the input part 15b does not move regardless of sliding of the piston part 12d2 in the first period at the beginning of a brake operation but moves in conjunction with sliding of the piston part 12d2 when the brake operation increases after the first period is finished. The wheel cylinder WC (braking force applying mechanism) is configured to be able to apply a braking force to each of the vehicle wheels W based on the first hydraulic pressure and the second hydraulic pressure. The vehicle braking device includes the actuator 16 (second hydraulic pressure generating mechanism) generating a desired second hydraulic pressure and the hydraulic pressure control part 17a which causes the actuator 16 (second hydraulic pressure generating mechanism) to generate a second hydraulic pressure depending on a brake operation and causes the wheel cylinders WC (braking force applying mechanism) to apply a braking force to the vehicle wheels W based on the second hydraulic pressure.

In this manner, even though the input part 15b does not move regardless of sliding of the piston part 12d2 in the first period at the beginning of the brake operation, a desired hydraulic pressure depending on the brake operation can be reliably generated by the hydraulic pressure control part 17a.

In the vehicle braking device according to the first embodiment, the hydraulic chamber 12d7 (second hydraulic chamber) is partitioned between the piston 12d2 and the input part 15b, the oil passage 41 serving as a hydraulic pressure path is disposed between the second hydraulic chamber 12d7 and the reservoir tank 14 serving as a low-pressure source, and the normally-closed electromagnetic valve 41a is disposed on the oil passage 41.

According to this, since the electromagnetic valve 41a is closed when the power supply fails, a space between the piston 12d2 and the input part 15b becomes a solid body. For this reason, the response of application of a braking force when the power source fails can be improved.

In the embodiment described above, in place of the electromagnetic valve 41a, an orifice may be disposed. In addition, the electromagnetic valve 41a and the oil passage 41 function as orifices, respectively.

In this manner, in the vehicle braking device according to the first embodiment, the hydraulic chamber 12d7 (second hydraulic chamber) is partitioned between the piston part 12d2 and the input part 15b, the oil passage 41 serving as the hydraulic pressure path is disposed between the second hydraulic chamber 12d7 and the reservoir tank 14 serving as a low-pressure source, and the orifice is disposed on the oil passage 41.

According to this, in sudden braking, the orifice operates to sharply increase a hydraulic pressure in the second hydraulic chamber 12d7, and a force corresponding to the hydraulic pressure acts on the input part 15b. For this reason, the response of application of a braking force in sudden braking can be improved.

Second Embodiment

A second embodiment in which a vehicle braking device according to the present invention is applied to a vehicle will be described below with reference to the accompanying drawing. The vehicle in the embodiment is a hybrid vehicle. FIG. 3 is a schematic view showing a configuration of the vehicle braking device.

The hybrid vehicle is a vehicle in which drive wheels, for example, rear-left and rear-right wheels Wrl and Wrr are driven by a hybrid system. The hybrid system is a power train using drive sources of two types including an engine (not shown) and a motor 51 (vehicle driving motor) which are combined to each other. The second embodiment employs a parallel hybrid system using a scheme in which wheels are directly driven by at least one of the engine and the motor 51. In addition to this system, a serial hybrid system is known. In this system, wheels are driven by the motor 51, and the engine functions as an electric power supply source for the motor 51.

In a hybrid vehicle on which the parallel hybrid system is mounted, a drive force from the engine and a drive force from the motor 51 are designed to be transmitted to the drive wheels. This hybrid vehicle is a rear-wheel-drive vehicle.

The motor 51 transmits its drive force through a differential arrangement 52 and drive shafts to drive the rear-left and rear-right wheels Wrl and Wrr serving as drive wheels. The motor 51 is to assist an output from the engine and to increase the drive force. On the other hand, when the vehicle is braked, the motor 51 generates electricity to charge a battery 54. More specifically, the motor 51 is electrically coupled to an inverter 53, and the inverter 53 is electrically coupled to the battery 54 serving as a DC power source. The inverter 53 converts an AC voltage input from the motor 51 into a DC voltage to supply the DC voltage to the battery 54. Inversely, the inverter 53 converts a DC voltage from the battery 54 into an AC voltage to output the AC voltage to the motor 51.

In the second embodiment, the vehicle braking device includes a hydraulic pressure braking part A which is similar to the braking part in the first embodiment and a regenerative braking part B (regenerative braking device). The regenerative braking part B includes the motor 51, the inverter 53, the battery 54, and a hybrid ECU 55 (will be described later). The regenerative braking part B is to apply a regenerative braking force based on a brake operation state detected by the pedal stroke sensor 11a (or the hydraulic pressure sensor 16a) to one of pairs of front vehicle wheels Wfl and Wfr and rear vehicle wheels Wrl and Wrr (the rear wheels Wrl and Wrr driven by the motor 51 serving as the drive source in the second embodiment).

The inverter 53 is coupled to the hybrid ECU 55 such that the hybrid ECU 55 and the inverter 53 can communicate with each other. The hybrid ECU 55 derives a necessary engine output and an electric motor torque from an accelerator position and a shift position (calculated from a shift position signal input from a shift position sensor (not shown)) and controls the motor 51 through the inverter 53 according to the derived electric motor torque request value. The battery 54 is coupled to the hybrid ECU 55, and the hybrid ECU 55 monitors a charging state, a charging current, and the like of the battery 54.

The brake ECU 17 is coupled to the hybrid ECU 55 such that the brake ECU 17 can communicate with the hybrid ECU 55, and cooperative control of a regenerative brake and a hydraulic brake performed by the motor 51 is performed such that all braking forces of the vehicle is equal to that of a vehicle equipped with only a hydraulic brake. More specifically, in response to a braking request from a driver, i.e., a brake operation state, the brake ECU 17 outputs a regenerative indicated value which is a partial charge of the regenerative braking part in the all braking forces to the hybrid ECU 55 as a target value of the regenerative braking part, i.e., a target regenerative braking force. The hybrid ECU 55 derives a regenerative effective value at which the regenerative brake is actually operated in consideration of a vehicle speed, a battery charging state, and the like based on the input regenerative indicated value (target regenerative braking force), controls the motor 51 through the inverter 53 such that a regenerative braking force corresponding to the regenerative effective value is generated, and outputs the derived regenerative effective value to the brake ECU 17.

The brake ECU 17, in the first embodiment, in normal braking, in a first period in which the input part 15b does not move regardless of sliding of the piston part 12d2, causes the actuator 16 to increase a hydraulic pressure generated by the booster mechanism 15 (hydraulic pressure control part). The brake ECU 17, in place of all or a part of the hydraulic pressure braking force increased by the actuator 16 depending on the brake operation, causes a regenerative braking part B to apply a regenerative braking force corresponding to the braking force.

The brake ECU 17, as shown in FIG. 4, has a regenerative braking force applying part 17b. When the regenerative braking force applying part 17b detects the start of operation of the brake pedal 11 on the basis of a detection signal acquired from the pedal stroke sensor 11a, the regenerative braking force applying part 17b causes the regenerative braking part B to generate a hydraulic pressure depending on the brake operation until the hydraulic pressure sensor 16a detects a hydraulic pressure higher than a predetermined pressure (for example, 0 Pa) from the operation start time.

As described above, in the vehicle braking device according to the second embodiment, the input part 15b does not move regardless of sliding of the piston part 12d2 in a first period at the beginning of the brake operation, and moves in conjunction with the sliding of the piston part 12d2 when the brake operation increases after the first period is finished. The vehicle braking device according to the second embodiment includes the regenerative braking part B (regenerating braking device) applying a regenerative braking force to the vehicle wheels (the rear wheels Wrl and Wrr driven by the motor 51) and the regenerative braking force applying part 17b which causes the regenerative braking part B to apply a regenerative braking force to the vehicle wheels W in the first period in which the input part 15b does not move regardless of sliding of the piston part 12d2.

According to this, even though the input part 15b does not move regardless of the sliding of the piston part 12d2 in the first period at the beginning of a brake operation, the regenerative braking force applying part 17b can maintain regenerative efficiency at a high level.

The invention claimed is:

1. A vehicle braking device comprising: an operation corresponding pressure generating mechanism which has a cylinder part and a piston part sliding in the cylinder part in conjunction with a brake operation for operating a brake operation member and generates a hydraulic pressure corresponding to the brake operation in the cylinder part and a first hydraulic chamber partitioned by the piston part;
   a first hydraulic pressure generating mechanism having an input part slid and moved in the cylinder by being directly pressed by the piston part or an interpolated member interposed between the input part and the piston part in conjunction with sliding of the piston part and a hydraulic pressure generating part generating a first hydraulic pressure corresponding to movement of the input part based on a hydraulic pressure of an accumulating part accumulating a hydraulic fluid;
   a second hydraulic pressure generating mechanism generating a desired second hydraulic pressure; and
   a braking force applying mechanism configured to apply a braking force to the wheel based on the first hydraulic pressure and the second hydraulic pressure, wherein
   the input part does not move regardless of sliding of the piston part in a first period at the beginning of the brake operation and moves in conjunction with sliding of the piston part when the brake operation increases after the first period is finished,
   the vehicle braking device further includes a hydraulic pressure control part which generates the second hydraulic pressure depending on the brake operation by the second hydraulic pressure generating mechanism in the first period and applies a braking force to the wheel based on the second hydraulic pressure by the braking force applying mechanism,
   the second hydraulic pressure generating mechanism is coupled to the braking force applying mechanism by an oil passage of the second hydraulic pressure generating mechanism, and
   the first hydraulic pressure generating mechanism is coupled to the braking force applying mechanism by the oil passage of the second hydraulic pressure generating mechanism.

2. The vehicle braking device according to claim 1, comprising:
   a regenerative braking device applying a regenerative braking force to the wheel, wherein the input part does not move regardless of sliding of the piston part in a first period at the beginning of the brake operation and moves in conjunction with the sliding of the piston part when the brake operation increases after the first period is finished; and
   a regenerative braking force applying part causing the regenerative braking device to apply a regenerative braking force to the wheel in the first period in which the input part does not move regardless of sliding of the piston part.

3. The vehicle braking device according to claim 2, wherein
   a second hydraulic chamber is partitioned between the piston part and the input part, a hydraulic pressure path is disposed between the second hydraulic chamber and a low-pressure source, and an orifice is disposed on the hydraulic pressure path.

4. The vehicle braking device according to claim 2, wherein
   a second hydraulic chamber is partitioned between the piston part and the input part, a hydraulic pressure path is disposed between the second hydraulic chamber and a low-pressure source, and a normally-closed electromagnetic valve is disposed on the hydraulic pressure path.

5. The vehicle braking device according to claim 3, wherein
   a second hydraulic chamber is partitioned between the piston part and the input part, a hydraulic pressure path is disposed between the second hydraulic chamber and a low-pressure source, and a normally-closed electromagnetic valve is disposed on the hydraulic pressure path.

6. The vehicle braking device according to claim 1, wherein
   a second hydraulic chamber is partitioned between the piston part and the input part, a hydraulic pressure path is disposed between the second hydraulic chamber and a low-pressure source, and an orifice is disposed on the hydraulic pressure path.

7. The vehicle braking device according to claim 6, wherein
a second hydraulic chamber is partitioned between the piston part and the input part, a hydraulic pressure path is disposed between the second hydraulic chamber and a low-pressure source, and a normally-closed electromagnetic valve is disposed on the hydraulic pressure path.

8. The vehicle braking device according to claim 1, wherein
a second hydraulic chamber is partitioned between the piston part and the input part, a hydraulic pressure path is disposed between the second hydraulic chamber and a low-pressure source, and a normally-closed electromagnetic valve is disposed on the hydraulic pressure path.

\* \* \* \* \*